Aug. 12, 1952     J. B. MALIN     2,606,538
FUEL INJECTION INTERNAL-COMBUSTION ENGINE

Filed Dec. 3, 1946     2 SHEETS—SHEET 1

INVENTOR.
JAY B. MALIN
BY Daniel Stryker
ATTORNEY

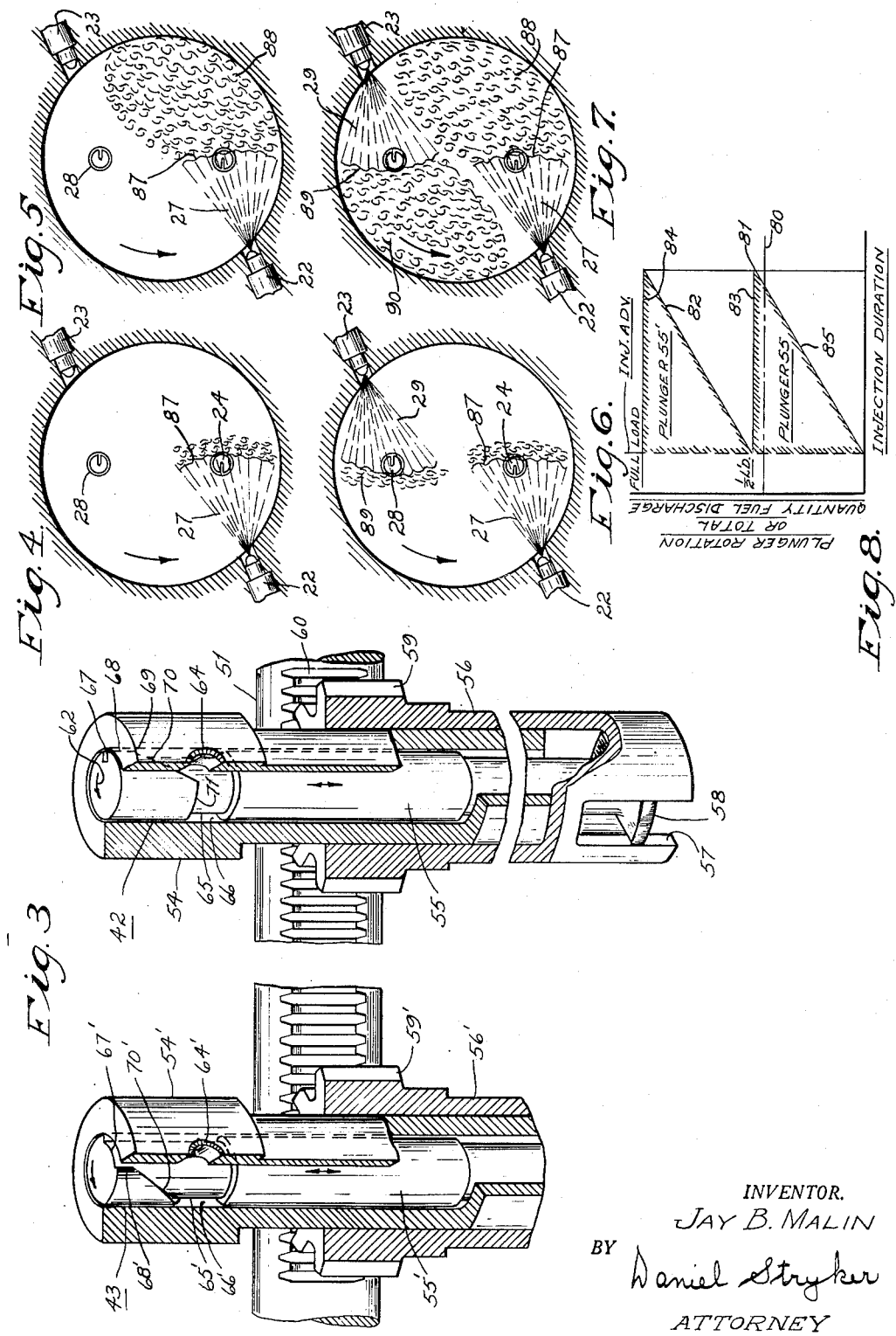

Patented Aug. 12, 1952

2,606,538

UNITED STATES PATENT OFFICE 2,606,538

FUEL INJECTION INTERNAL-COMBUSTION ENGINE

Jay B. Malin, Fishkill, N. Y., assignor to The Texas Company, New York, N. Y., a corporation of Delaware Application December 3, 1946, Serial No. 713,791

6 Claims. (Cl. 123—32)

This invention relates to an internal combustion engine operating with fuel injection and having a plurality of injection nozzles for each cylinder, wherein the number of nozzles of a cylinder which are in operation per cycle depends upon engine load.

The invention also relates to such an engine operating with swirling compressed air and fuel injection into the swirling compressed air within the cylinder combustion space to form localized or stratified mixtures which are ignited by spark. A preferred embodiment of this invention involves an internal combustion engine of the foregoing spark-ignition type, wherein the combustion is independent of the spontaneous ignition quality of the fuel and knocking of the engine is prevented.

The invention also relates to a novel fuel pump for use with internal combustion engines of the foregoing character.

Diesel engines have heretofore been proposed having plural nozzles for each cylinder which come into operation successively on each cycle, wherein the number of nozzles per cylinder in service per cycle varies with load, and all nozzles in service have the same cutoff or termination of injection in the cycle. The present invention is distinguished by the fact that all the nozzles per cylinder in service per cycle have the same injection advance, and also by the fact that the low load or idling nozzle is maintained at full duration and capacity on each cycle at a higher load range, while a higher load nozzle has a variable cutoff in accordance with load within the higher load range.

Fuel-injection spark-ignition engines have also been proposed, wherein a single fuel injection nozzle having a plurality of fuel ports is regulated by a sliding sleeve interconnected with the throttle control so that the number of jets and spacial distribution of the injected fuel per cycle vary with load. The present invention is distinguished by the fact that each cylinder has a plurality of nozzles supplied by separate pump plungers, together with a fixed cutoff of the low load nozzle and a variable cutoff of a higher load nozzle within the higher load range. The invention is further distinguished by the injection of spaced plural jets into swirling compressed air to form the separate stratified mixtures, with simultaneous plural spark ignition of the stratified mixtures.

In the copending application of Everett M. Barber, Serial No. 10,598, filed February 25, 1948, now Patent No. 2,484,009, dated October 11, 1949, filed as a continuation-in-part of Serial No. 513,232, filed December 7, 1943, now abandoned, there is disclosed and claimed a fuel-injection spark-ignition engine, wherein fuel is injected into swirling compressed air in the cylinder combustion space toward the latter part of the compression stroke, the first increment of injected fuel is spark ignited substantially as soon as combustible fuel vapor-air mixture is formed therefrom to establish a flame front, and the injection of fuel is continued into the swirling compressed air immediately in advance of the flame front to progressively form additional combustible fuel vapor-air mixtures which are ignited by the flame front and burned substantially as rapidly as formed, and knocking of the engine is prevented. In a specific embodiment disclosed and claimed therein, fuel is injected tangentially into the combustion space in the direction of air swirl, and spark ignition of the first increment of injected fuel is secured by a spark plug mounted adjacent the injection nozzle, with its electrodes positioned at an edge of the spray form adjacent the periphery of the combustion space and in the region of diffusing fuel vapor-air mixture first produced therefrom.

The present invention is particularly applicable to an engine of this non-knocking type, especially one having large diameter cylinders. This invention is distinguished by the provision of two or more of said injection nozzles equally spaced about the cylinder, with plural spark plugs for simultaneously igniting the first increments of injected fuel from all nozzles in service at the higher loads, and with control of the output or power of the engine by varying the number of injection nozzles per cylinder which are in service per cycle in accordance with load, in the manner set forth above.

At part load operation of an engine having swirling air and a stratified charge produced by injecting fuel into a localized portion of that swirling air, an opportunity is presented for the fringes of the stratified charge, or fuel cloud, to become dissipated by mixing with the surrounding swirling air so as to form an incombustibly lean mixture. The fuel thus lost becomes a greater percentage of the total charge when (1) the time interval between injection and ignition is increased, (2) the total charge is decreased for part load operation with a plurality of nozzles, and (3) when the surface to volume ratio of the fuel patch or cloud is increased.

In accordance with the present invention, an engine cylinder having two or more fuel injectors is operated at part throttle by cutting out one or more of the injectors and having in service the minimum number of injectors operating at their most efficient capacity to provide the proper fuel-air ratio of the localized or stratified charge. This minimizes the effects of (2) and (3) listed above, and enables the injector or injectors remaining in service per cycle to function at their most economical fuel consumption level. Experimental work on a large diameter cylinder having two injectors has indicated that there is a minimum point in the fuel/air: indicated specific fuel consumption curve, and that when one injector is cut out at the same lower load the minimum point is lowered or displaced toward a lower overall fuel/air ratio. The present invention is designed to take advantage of this discovery, and to provide an operation which is beneficial for engines of the stratified charge type.

Where the invention is applied to a non-knocking engine wherein spark ignition occurs promptly after the start of fuel injection, the effect of the time element of (1) above is substantially eliminated. Moreover, by confining the localized charge to that produced from a single nozzle at low load or idling, the surface to volume ratio of the fuel patch is maintained much less than is produced by the injection of the same amount of fuel from two or more spaced nozzles. This minimizes the effect of item (3) above. The net result is more efficient part load operation with substantial fuel economy.

It is therefore a principal object of the present invention to provide a novel method of and construction for operating a fuel injection engine having two or more injectors per cylinder at the most economical fuel consumption level.

A further object of the present invention is to provide a stratified charge internal combustion engine, and method of operating said engine, designed to avoid or minimize dissipation of the fringes of the stratified charge into incombustibly lean mixture prior to ignition, to substantially improve the fuel economy.

Another object of the present invention is to provide a non-knocking internal combustion engine of the type disclosed in said application Serial No. 10,598, wherein plural injectors for each cylinder are provided with the same injection advance, with simultaneous spark ignition of the combustible mixtures formed from the first increments of injected fuel from the plural fuel jets, and wherein the number of injectors operating per cycle decreases with load, while any remaining injector in service continues to function at a higher rate, affording more efficient part load operation.

Still another object of the present invention is to provide a novel fuel pump for an engine of the foregoing character, which pump is simple and sturdy in construction, reliable in operation, readily controlled from the customary throttle, and capable of being driven from the usual engine cam shaft.

Other objects and advantages of the present invention will be apparent from the following description when taken in conjunction with the attached drawing and appended claims.

In the drawing, which discloses a preferred embodiment of the invention:

Fig. 3 is an enlarged perspective view of two cooperating pump plungers of the fuel pump, with their cylinders partially broken away and in section, and also illustrating the rack control;

Figs. 4–7, inclusive, are diagrammatic views of the engine combustion space, illustrating the beginning and end of injection for approximately half load and full load operation, respectively; and Fig. 8 is a diagram plotting total quantity of fuel injected per cycle against the injection duration or pump plunger rotation, illustrating the quantity of fuel supplied by the two nozzles per cycle at different engine loads.

Figure 1:
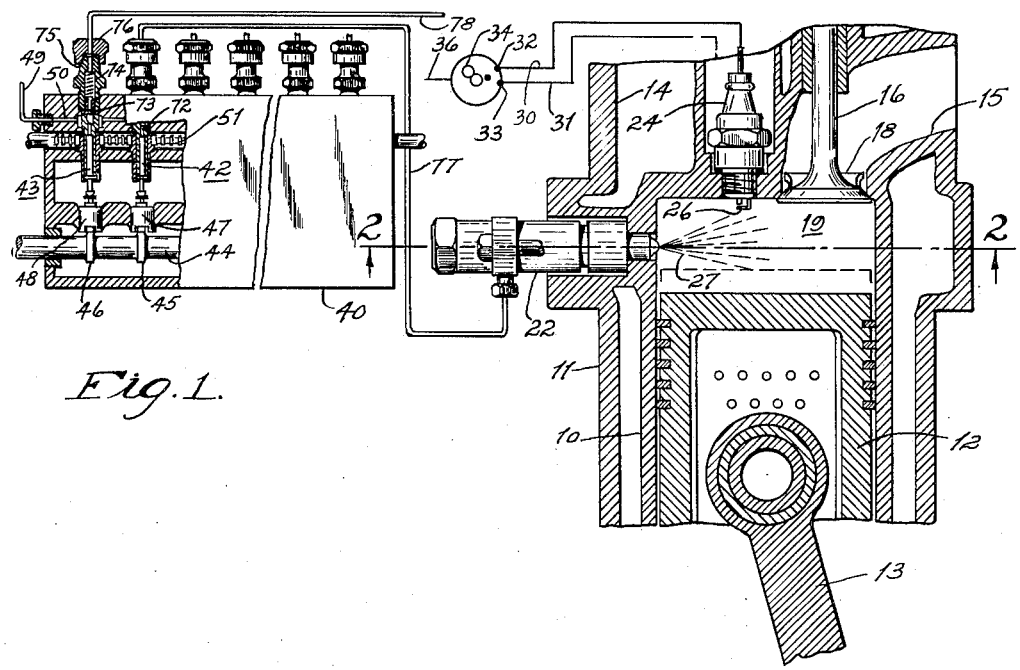
Fig. 1 is a vertical sectional view of an engine cylinder taken on the plane of the line 1—1 of Fig. 2, together with the fuel pump partly in elevation and partly in section to illustrate the construction thereof.
Figure 2:
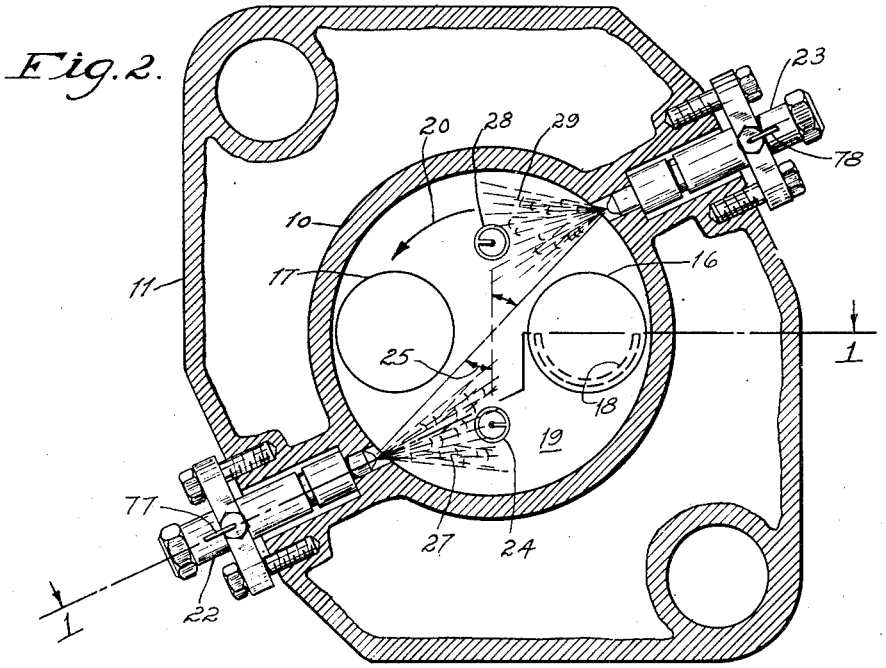
Fig. 2 is a horizontal sectional view looking upwardly on the cylinder head and taken on the plane of line 2—2 of Fig. 1.

Referring to Figs. 1 and 2, the engine cylinder is indicated at 10 with water jacket 11, piston 12 and connecting rod 13 which runs to the usual crank shaft, not shown. The cylinder head 14 is formed with an air inlet port 15 controlled by an intake valve 16 and a similar exhaust port controlled by an exhaust valve 17. The intake valve is equipped with a shroud 18 which is set tangentially so that, on the suction stroke of piston 12, air is drawn into the disc-shaped combustion space 19 in a manner to impart a swirling movement of high velocity to this air within the combustion space, as indicated by the arrow 20. This high velocity air swirl is maintained during the compression stroke of piston 12.

Mounted in the cylinder wall and directed generally tangentially of the combustion space 19, are a low load nozzle 22 and a high load nozzle 23. Carried by the cylinder head is a spark plug 24 positioned on the air downstream side of nozzle 22 at a central angular distance of about 20–90° and, preferably, about 30–60°, as indicated by the arrow 25 (Fig. 2). The electrodes 26 of spark plug 24 are positioned slightly below the inner surface of the cylinder head and arranged so as to be closely adjacent the upper side of the fuel jet 27 from nozzle 22. The arrangement is such that the electrodes 26 are out of the direct path of atomized liquid fuel particles, but are positioned so as to be contacted by the combustible fuel vapor-air mixture rapidly formed at the edge of the spray and diffusing away therefrom.

A similar spark plug 28 is mounted in the cylinder head in a similar position with respect to the spray form 29 from nozzle 23. It will be noted that nozzles 22 and 23 are arranged at diametrically opposite sides of the cylinder and have their respective spray forms arranged to uniformly impregnate the air on opposite sides of the combustion space as it swirls past said nozzles.

Spark plugs 24 and 28 are also arranged diametrically opposite each other and, as shown in Fig. 2, are positioned about intermediate between the center of the combustion space and the periphery thereof. However, it should be pointed out that the spark plugs can be located in any suitable positions with their electrodes closely adjacent the edges of the respective spray forms so as to contact combustible fuel vapor-air mixtures substantially as soon as formed from the first increments of injected fuel from the nozzles 22 and 23, respectively. For example, plugs 24 and 28 can also be carried in the cylinder wall with their electrodes adjacent the periphery of the combustion space and along the outer edges of the spray forms 27 and 29.

As shown diagrammatically in Fig. 1, leads 30 and 31 are respectively connected to contacts 32 and 33, which are simultaneously contacted by a suitable rotary distributor 34 driven in synchronism with the engine. Lead 30 extends to spark plug 24 and lead 31 to spark plug 28. It will be understood that the distributor 34 is part of a conventional ignition system, including lead 36, whereby the timing of spark ignition can be correlated and synchronized with the timing of fuel injection on each cycle. In this manner sparks of igniting intensity are present simultaneously at the electrodes of plugs 24 and 28 on each cycle, usually about 4 to 10 crank-angle degrees following the start of fuel injection, at which time combustible fuel vapor-air mixture from the first increment of injected fuel from each of nozzles 22 and 23 reaches the electrodes at higher engine loads. At lower engine loads or idling, nozzle 23 is cut out, and fuel is injected only from nozzle 22 on each cycle. If desired, plug 28 can also be cut out when nozzle 23 is idle; but this is not necessary and both plugs can continuously remain in service at all engine loads.

In accordance with the present invention, nozzle 22 functions to supply the entire quantity of injected fuel on each cycle from idling up to approximately half load. At higher loads above approximately half load, nozzle 23 also comes into play. Both nozzles 22 and 23 have the same injection advance so that they both start fuel injection simultaneously at the higher loads, such as about 75 to 30° before top dead center of the compression stroke of piston 12. Nozzle 22 serves to vary the quantity of fuel injected on each cycle in accordance with load within the lower load range by varying the duration of injection. Then, when nozzle 23 comes into play at the higher loads, nozzle 22 remains constant at its full capacity and duration throughout the higher load range, while nozzle 23 is varied as to duration of injection in accordance with load.

A novel fuel pump for accomplishing the foregoing controlled injection from the two nozzles 22 and 23 in accordance with load is illustrated in Figs. 1 and 3. This comprises a pump block 40 containing two cooperating pump cylinders and plungers for each engine cylinder. The pump illustrated is for a multi-cylinder engine, and it will be understood that there will be eight pump cylinders with injection piping for a four-cylinder engine. As shown, more particularly in Fig. 1, the two cooperating pump cylinders and plungers are designated generally as 42 and 43. Mounted in suitable bearings in the pump block is a cam shaft 44 carrying identical cams 45 and 46, which actuate the plungers of pumping units 42 and 43, respectively, through the medium of the cam followers 47 and 48. Fuel is supplied to all the pumping cylinders through the inlet line 49 which communicates with a fuel gallery 50 within the pump block. Also mounted within the pump block for longitudinal sliding movement is a rack bar 51 which is connected in conventional manner with the engine throttle.

Referring more particularly to Fig. 3, the low load pumping unit 42 comprises a pump cylinder 54 within which pump plunger 55 is reciprocatingly and rotatively mounted. Surrounding the lower end of cylinder 54 and extending there-beyond is a sleeve 56 having diametrically opposed slots 57 within which extend lugs 58 carried by the pump plunger 55. The upper end of sleeve 56 carries a rack gear 59 meshing with the teeth 60 of the rack bar 51. Consequently, sliding movement of rack bar 51 to the left rotates plunger 55 in a counterclockwise direction, as shown by arrow 62, which is the direction for increasing load. Reciprocating movement of plunger 55 is permitted by the lugs 58 riding in slots 57.

Pump cylinder 54 is formed with a radial bore of port 64 which communicates with the fuel gallery 50 at its outer end. In Fig. 3, one-half of the port 64 is shown, the other half being broken away for clearness in illustration. The plunger 55 is formed with a narrow portion 65 of reduced diameter providing an annular fuel chamber 66 between the plunger and cylinder 54. This annular chamber is at all times in open communication with a longitudinal slot 67 extending from the top face of the plunger downwardly to the chamber 66. The near face of slot 67, as viewed in Fig. 3, has a vertical edge 68 which meets at the point 69 the upper end of a helix 70. This helix extends downwardly about the plunger slightly less than 90° and is joined at its lower end by a horizontal surface 71.

Plunger 55 is shown in Fig. 3 at the upper end of its pumping stroke, and is rotatively set by the rack bar 51, so that the lower end of helix 70 is opposite port 64. This means that plunger 55 is set to deliver on each stroke just slightly less than its maximum capacity of fuel per cycle. Rotation of plunger 55 in a clockwise direction from that shown will bring the edge of helix 70 opposite the lower side of port 64 at an earlier point in the cycle and thus reduce the duration of the pumping stroke of plunger 55, and consequently the amount of fuel delivered per cycle.

It will be understood that as plunger 55 descends on its suction stroke, fuel will be drawn in from gallery 50 through port 64 to fill the annular chamber 66, slot 67, and accumulating chamber indicated at 72 (Fig. 1), which latter is formed above the top of plunger 55 within cylinder 54. Then, on the upward or pumping stroke of plunger 55, and as soon as the upper face of the plunger has covered port 64, that fuel which is trapped in the accumulating chamber is immediately raised by further pumping movement to high injection pressure. Immediately above the accumulating chamber in both of the pumping units 42 and 43 is a spring-pressed check valve, indicated for unit 43 by the numeral 73. This check valve is normally held on its seat by spring pressure, except when fuel in the accumulating chamber is being raised to injection pressure when the check valve opens to allow fuel to pass into the discharge chamber 74 formed in the fitting 75, and to which the injection piping is connected by cap 76.

As shown in Fig. 1, the injection piping 77, leading from pumping unit 42, is connected to nozzle 22; and it will be understood that the injection piping 78 leads to nozzle 23. Each of the nozzles 22 and 23 is of the conventional type, having a spring-pressed pintle valve which opens under injection pressure to uncover the discharge port in the nozzle tip and permit fuel injection. When the supply of fuel under injection pressure is terminated, it will be understood that the pintle valve of the nozzle slams shut on its seat to terminate fuel injection and check valve 73 of that pumping unit also closes upon release of the fuel pressure.

Referring again to Fig. 3, as the plunger 55 continues its upward reciprocating movement on its pumping stroke, eventually the edge of helix 70 moves upwardly opposite the lower side of port 64, whereupon the accumulating chamber above piston 55 is brought into communication through slot 67 and annular chamber 66 with port 64. This permits the fuel in the accumulating chamber to pass back into the fuel gallery 50 which is at low pressure, and consequently immediately lowers the pressure in the injection line. This terminates fuel injection; and the balance of the upward stroke of plunger 55 takes place without further discharge of fuel under injection pressure.

The cooperating pumping unit 43 is constructed similarly to that of unit 42, similar parts being designated by corresponding primed reference numerals. In this case, however, the slot 67', communicating with the annular chamber 66', is widened to extend approximately 90° about the plunger 55'. In the position shown, the vertical edge 68' of the slot is thus displaced angularly nearly 90° from the corresponding vertical edge 68 of the narrow slot 67 of pumping unit 42. This brings first the channel or wide slot 67' and then the annular chamber 66' of unit 43 opposite the port 64', during the entire range of reciprocating or pumping movement of plunger 55'. Consequently, no fuel is supplied under injection pressure to the injection line 78 and to nozzle 23 in this position of rotative adjustment.

This is illustrated in Fig. 8, wherein the rotative adjustment of the plungers, which corresponds to the fuel supplied by plunger 55 and 55', respectively, is plotted as the ordinate against injection duration of the plungers as abscissa. The horizontal dot and dash line 80 represents the rotative position of plungers 55 and 55' illustrated in Fig. 3. In this position, plunger 55 supplies the total quantity of fuel injected per cycle. Moreover, that plunger is delivering just short of its maximum capacity, or has just less than its maximum duration of delivering fuel under injection pressure to nozzle 22. Further adjusting movement of rack bar 51 toward the left by means of the throttle control in response to increasing load simultaneously rotates plungers 55 and 55' counter-clockwise, thereby progressively increasing the delivery of fuel by plunger 55 to its maximum at the point 81. This is reached when the lower end of helix 70 rotates into registration with the bottom of port 64, so that the lower horizontal surface 71 at the upper end of annular fuel chamber 66 then controls the point of cutoff of pumping unit 42. At this point of rotative adjustment, the upper edge of helix 70' of pumping unit 43 is just brought into registration with port 64'. The length of the vertical edge 68' is just greater than the diameter of port 64', so that plunger 55' then has a very short pumping period during which fuel under injection pressure is supplied to nozzle 23. In that position, only a small amount of fuel is injected per cycle from nozzle 23, while nozzle 22 delivers its maximum quantity. This is illustrated in Fig. 8 by a position just above point 81.

Further rotative movement of plunger 55 and 55' in counter-clockwise drection for increasing load within the upper load range brings a different part of the horizontal surface 71 of plunger 55 opposite port 64, so that this pumping unit 42 remains at maximum capacity and duration. At the same time, the helix 70' of plunger 55' is now in play opposite the port 64'. Thus the amount of fuel under injection pressure delivered by plunger 55' on each cycle progressively increases with increasing load, as indicated by the diagonal line 82 of Fig. 8; while the amount of fuel delivered under injection pressure by plunger 55 remains constant at full capacity as indicated by the horizontal line 83. It will be appreciated that helix 70' of plunger 55' is displaced angularly about 90° from the helix 70 of plunger 55. For maximum load, both plungers 55 and 55' are rotated their full extent in a counter-clockwise direction. This leaves the horizontal surface 71 of plunger 55 still opposite port 64, while a corresponding horizontal surface at the lower end of helix 70' (which is behind plunger 55' as illustrated in Fig. 3), has just moved opposite port 64', so that plunger 55' is now also delivering its full load quantity per cycle, as indicated by the top horizontal line 84 in Fig. 8.

As previously explained, plungers 55 and 55' are driven in unison by identical cams 45 and 45, respectively, carried by cam shaft 44, which latter is driven in conventional manner from the engine at half of the crankshaft speed for four-cycle operation. Consequently, plungers 55 and 55' are always at the same point in their pumping strokes. This means that pumping units 42 and 43 have the same injection advance. During operation from about half load up to full load when both nozzles 22 and 23 are functioning, the injection of fuel is initiated from both nozzles at the same point in the cycle. As the engine load is decreased from full load to about half load, the variation in fuel supply is accomplished by varying the duration of injection from nozzle 23, while nozzle 22 remains at full duration. At about half load, nozzle 23 is cut out entirely; and then further reduction in load is taken care of by varying the duration and consequently the quantity of fuel injected per cycle from nozzle 22, as indicated by the inclined line 85 of Fig. 8. The net result is that both nozzles 22 and 23 are operated at all times at substantially their most economical level to uniformly impregnate those portions of the compressed air swirling past them during the injection period to take care of the load demands.

The operation of the present engine is more particularly illustrated in the diagrammatic views of Figs. 4–7, inclusive. Fig. 4 illustrates the beginning of injection for just under half-load operation, with a setting of the fuel pump as shown in Fig. 3, and indicated by the horizontal line 80 of Fig. 8. At this setting nozzle 22 is in service, while nozzle 23 remains idle. At about 70 to 30° before top dead center, the injection of fuel is initiated by jet 27 from nozzle 22. About 4–10 crank angle degrees thereafter, combustible fuel vapor-air mixture from the upper edge of the first increment of injected fuel has reached the electrodes 26 of plug 24, and a spark of igniting intensity is present at said electrodes at this time to initiate combustion and establish a flame front across the path of the swirling air, as indicated at 37.

Fig. 5 indicates the same cycle at substantially the end of fuel injection, which may have a duration of about 30 to 70° at full load. It will be appreciated that following ignition and establishment of the flame front 87, as illustrated in Fig. 4, the injection of fuel is continued from nozzle 22 immediately in advance of the flame front so that additional increments of combustible fuel vapor-air mixture are progressively formed and burned substantially as rapidly as produced. The resulting products of combustion are carried by the swirling mass beyond the flame front, and these products substantially fill the combustion space between the flame front 87 and the locus of nozzle 23, as indicated by the numeral 88 in Fig. 5.

Fig. 6 illustrates the beginning of injection for substantially full load operation. Fuel is simultaneously injected at the same point in the cycle from both nozzles 22 and 23 in jets 27 and 29, respectively, at diametrically opposite sides of the combustion space. Combustible mixtures formed from the first increments of injected fuel from both nozzles 22 and 23 are simultaneously ignited by plugs 24 and 28 to establish the two flame fronts 87 and 89 at the opposite sides of the combustion space. Fuel injection is continued from both nozzles 22 and 23 immediately in advance of the respective flame fronts 87 and 89, while products of combustion are swept beyond the flame fronts. Consequently, at the termination of injection for full load, illustrated in Fig. 7, the products of combustion 88 formed by the progressive burning of combustible mixture produced by fuel injection from nozzle 22, and the products of combustion 90 formed by the progressive burning of combustible mixtures produced by fuel injection from nozzle 23, substantially fill the entire combustion space, with the exception of the remaining localized portions of swirling air which are at that instant being impregnated by the final increments of injected fuel occupied by jets 27 and 29.

While in the specific embodiment described above, two nozzles are provided for each cylinder, located at diametrically opposite sides, together with a fuel pump having two pump cylinders for each engine cylinder, it will be understood that the present invention is applicable to a larger number of nozzles per cylinder. For example, three nozzles per cylinder may be provided located approximately 120° from each other. In this case, it will be understood that the fuel pump is equipped with three cooperating pumping units per engine cylinder, and the helices are offset angularly of the pump plungers so as to bring the nozzles into operation in accordance with load, but with the same injection advance, in the manner previously described. Generally, it will be unnecessary to provide more than three nozzles per cylinder, even for the largest diameter cylinders. Moreover, for most cylinders of medium large size, the construction illustrated with two nozzles is preferred.

While the invention has been described above as applied to a non-knocking engine of the character in which ignition occurs immediately after the start of injection, it is to be understood that the invention is useful in connection with other types of engines. For example, the invention can advantageously be employed in a stratified charge engine of the character of the Hesselman engine employing swirling air, but in which injection is complete, or substantially complete, at the time ignition occurs. In fact, the invention is particularly useful in such an engine, since there is a longer period of time on each cycle for dissipation of fuel from the fringes of the stratified charge before ignition occurs.

The above-described fuel pump is disclosed and claimed per se in divisional application Serial No. 784,462, filed November 6, 1947.

Obviously many modifications and variations of the invention as hereinbefore set forth, may be made without departing from the spirit and scope thereof and, therefore, only such limitations should be imposed as are indicated in the appended claims.

What I claim is:

1. In the operation of an internal combustion engine having a power cylinder with a piston operating therein providing a combustion space, wherein fuel is injected into a localized portion of swirling compressed air during the latter part of the compression stroke to form a stratified mixture which is spark-ignited; the improvement which comprises injecting fuel from only one locus of injection into a localized portion of the swirling compressed air in said combustion space at one side of a diameter thereof in a manner to uniformly impregnate the air with fuel across a radius of the combustion space on each cycle during idling and lower loads up to about half load of the engine, injecting fuel into separate localized portions of the swirling compressed air from two loci of injection at diametrically opposite points in the combustion space at higher engine loads from about half load up to full load, with each injection being confined to a localized portion of the compressed swirling air in said combustion space at one side of a diameter thereof in a manner to uniformly impregnate the air with fuel across a radius of the combustion space, initiating injection on each cycle during said higher engine loads from said two injection loci simultaneously, maintaining the first mentioned locus of injection operating at full duration and capacity on each cycle within said higher load range while terminating injection at different points in the cycle to vary the amount of fuel injected in accordance with varying load within said higher load range from said other locus of injection, regulating the maximum duration of injection from each of said loci to impregnate with fuel only about half of the compressed air in said combustion space, maintaining a substantially uniform rate of fuel injection from each locus to impregnate each stratified localized portion of the swirling air at a controlled uniform fuel-air ratio throughout the load range to thereby effect substantial fuel economy, and simultaneously spark-igniting the resulting separate stratified portions of combustible fuel vapor-air mixture on each cycle at the higher engine loads.

2. In the operation of an internal combustion engine having a power cylinder with a piston operating therein providing a disc-shaped combustion space, wherein fuel is injected into compressed swirling air during the latter part of the compression stroke, the resulting combustible fuel vapor-air mixture formed from the first increment of injected fuel is positively ignited immediately after the start of fuel injection to establish a flame front, and the injection of fuel is continued after ignition immediately in advance of the flame front so that additional fuel vapor-air mixture is progressively formed immediately in advance of the flame front and burned substantially as rapidly as formed; the improvement which comprises injecting fuel from only one locus of injection into a localized portion of the compressed swirling air at one side of a diameter of the combustion space in a manner to uniformly impregnate the air with fuel across a radius of the combustion space on each cycle during low loads and idling of the engine, injecting fuel into separate localized portions of the swirling compressed air on each cycle from a plurality of loci of injection equally spaced about the combustion space at higher engine loads, with each injection being confined to a localized portion of the compressed swirling air at one side of a diameter of the combustion space in a manner to uniformly impregnate the air with fuel across a radius of the combustion space, initiating injection on each cycle during said higher engine loads from said plurality of injection loci simultaneously, maintaining the first-mentioned locus of injection operating at full duration and capacity on each cycle within said higher load range while terminating injection at different points in the cycle to vary the amount of fuel injected in accordance with varying load within said higher load range from one other locus of injection, regulating the maximum duration of injection from each of said loci to impregnate with fuel only its aliquot portion of the compressed air in said combustion space in accordance with the plural number of said loci, controlling the rate of fuel injection from each locus to impregnate each stratified portion of the swirling air at a controlled uniform fuel-air ratio throughout the load range to thereby effect substantial fuel economy, and simultaneously and positively igniting the separate localized portions of combustible fuel vapor-air mixture formed from the first increments of injected fuel from said plurality of injection loci immediately after the start of fuel injection to establish a plurality of flame fronts in said combustion space, with the injection of fuel being continued on each cycle from said plurality of injection loci immediately in advance of their respective flame fronts during said higher load range.

3. The method according to claim 2, wherein injection at the higher engine loads is from about half-load up to full load and is from two substantially diametrically opposite loci of injection discharging in the direction of air swirl, and the resulting separate localized portions of combustible fuel vapor-air mixture formed from the first increments of injected fuel from the two injection loci are simultaneously ignited at substantially diametrically opposite points adjacent the edges of said separate localized portions.

4. An internal combustion engine of the spark-ignition stratified charge type, comprising a power cylinder, a piston reciprocating therein, said parts confining a disc-shaped combustion space therebetween, means for introducing air into said cylinder in a manner to impart a high velocity air swirl therein, said air being compressed by said piston while said high velocity air swirl is maintained, two fuel injection nozzles mounted on said cylinder for injection into separate localized portions of the compressed swirling air at substantially diametrically opposed points in said combustion space, each nozzle being constructed to inject fuel only into a localized portion of the compressed swirling air at one side of a diameter of the combustion space and in a manner to uniformly impregnate the air with fuel across a radius of the combustion space, pumping means for supplying fuel at injection pressure to only one of said nozzles at idling and low loads up to substantially half load, and for supplying fuel and injection pressure to both of said nozzles at loads higher than half load on each cycle, control means for said pumping means providing for simultaneous initiation of injection from both nozzles on each cycle at said higher loads, with the first mentioned nozzle being maintained at full duration and capacity throughout said higher load range, while the duration of injection and consequently the amount of fuel injected from said other nozzle on each cycle is varied in accordance with load, said control means having provisions for regulating the maximum duration of injection of each nozzle to impregnate with fuel only about half of the swirling compressed air in said combustion space, and for regulating the rate of injection from each nozzle to thereby impregnate each stratified portion of the swirling compressed air at a controlled uniform fuel-air ratio throughout the load range to thereby effect substantial fuel economy, and means for simultaneously spark igniting the resulting separate stratified portions of combustible fuel vapor-air mixture on each cycle at the higher engine loads.

5. An internal combustion engine comprising a power cylinder, a piston operating therein, said parts confining a disc-shaped combustion space therebetween, air inlet means for said cylinder having provisions for imparting a high velocity air swirl within said combustion space which is maintained during compression, a plurality of fuel injection nozzles carried by said cylinder at substantially equally spaced points about said combustion space, each nozzle being directed to inject fuel only into a localized portion of the swirling compressed air at one side of a diameter of the combustion space in a manner to uniformly impregnate the air with fuel across a radius of the combustion space, pumping means for supplying fuel at injection pressure to only one of said nozzles at low loads and idling, and for supplying fuel at injection pressure to said one nozzle and at least one other nozzle at higher loads on each cycle, control mechanism for said pumping means providing for simultaneous initiation of injection from said nozzles on each cycle at the higher loads, with the first mentioned nozzle being maintained at full duration and capacity throughout said higher load range, while the duration of injection and consequently the amount of fuel injected from said other nozzle on each cycle is varied in accordance with load, said control mechanism having provisions for regulating the maximum duration of injection of each nozzle to impregnate only its aliquot portion of the compressed air in said combustion space in accordance with the plural number of fuel nozzles provided for said combustion space, said control mechanism regulating the rate of injection from each nozzle to thereby impregnate each stratified portion of the swirling compressed air at a controlled uniform fuel-air ratio throughout the load range to thereby effect substantial fuel economy, a plurality of positive ignition means carried by said cylinder, one for each nozzle, positioned close to and on the air-downstream side of said nozzles and arranged to contact the fuel vapor-air mixtures from the first increments of injected fuel from the respective nozzles substantially as soon as formed, and means synchronized with engine operation for actuating said positive ignition means to establish a plurality of flame fronts in said combustion space at the start of fuel injection on each cycle during said higher load range.

6. An internal combustion engine comprising a power cylinder, a piston operating therein, said parts confining a disc-shaped combustion space therebetween, air inlet means for said cylinder constructed to impart a high velocity swirling movement to the air within said combustion space which is maintained during compression, two diametrically opposed fuel injection nozzles carried by said cylinder for injection tangentially of said combustion space in the direction of air swirl, each nozzle being constructed to inject fuel only into a localized portion of the swirling compressed air at one side of a diameter of the combustion space in a manner to uniformly impregnate the air with fuel across a radius of the combustion space, pumping means for supplying fuel at injection pressure to only one of said nozzles from idling up to substantially half load, and for supplying fuel at injection pressure to both nozzles from substantially half load up to full load on each cycle, control mechanism for said pumping means providing for simultaneous initiation of injection from both nozzles on each cycle during said higher load range, with the first mentioned nozzle maintained at full duration and capacity throughout said higher load range, while the duration of injection and consequently the amount of fuel injected from said second nozzle on each cycle is varied in accordance with load, said control mechanism having provisions for regulating the maximum duration of injection of each nozzle to impregnate with fuel only about half of the compressed air within said combustion space, and for regulating the rate of fuel injection from both nozzles to impregnate each stratified portion of the swirling compressed air at a controlled uniform fuel-air ratio throughout the load range to thereby effect substantial fuel economy, two spark plugs carried by said cylinder, one for each nozzle, and positioned with their electrodes close to and on the air-downstream side of their respective nozzles so as to be contacted by combustible fuel vapor-air mixtures formed from the first increments of injected fuel from said nozzles substantially as soon as produced, and ignition means synchronized with engine operation for simultaneously producing sparks of igniting intensity at said plugs immediately after the start of fuel injection to produce two flame fronts in said combustion space, with the injection of fuel being continued on each cycle from both nozzles immediately in advance of their respective flame fronts during said higher load range.

JAY B. MALIN.

REFERENCES CITED

The following references are of record in the file of this patent:

UNITED STATES PATENTS

| Number | Name | Date |
| --- | --- | --- |
| 1,239,523 | Rogers | Sept. 11, 1917 |
| 1,616,157 | Werner | Feb. 1, 1927 |
| 1,751,254 | Sperry | Mar. 18, 1930 |
| 1,907,696 | Woolson | May 9, 1933 |
| 1,993,759 | Stockmeyer | Mar. 12, 1935 |
| 2,030,086 | Woolson | Feb. 11, 1936 |
| 2,058,487 | Mock | Oct. 27, 1936 |
| 2,125,293 | Hesselman | Aug. 2, 1938 |
| 2,223,756 | Dillstrom | Dec. 3, 1940 |
| 2,413,111 | Malin | Dec. 24, 1946 |
| 2,484,009 | Barber | Oct. 11, 1949 |

FOREIGN PATENTS

| Number | Country | Date |
| --- | --- | --- |
| 273,329 | Great Britain | Feb. 9, 1928 |
| 340,664 | Great Britain | Jan. 8, 1931 |
| 342,916 | Great Britain | Feb. 12, 1931 |